United States Patent Office 2,773,866
Patented Dec. 11, 1956

2,773,866

PRETREATMENT AND ESTERIFICATION OF CELLULOSE

Lejaren Arthur Hiller, Jr., and Fenton Hendy Swezey, Waynesboro, Va., assignors to E. I. du Pont de Nemours & Company, Wilmington, Del., a corporation of Delaware No Drawing. Application January 31, 1952, Serial No. 269,344

19 Claims. (Cl. 260—229)

This invention relates to a novel process for the preparation of highly-polymerized, acetone-soluble cellulose acetate. More particularly, it relates to a process for the preparation of a partially depolymerized cellulose which may be esterified in the presence of non-depolymerizing catalysts.

It is an object of the present invention to provide an improved process for the preparation of triesters of cellulose in the presence of catalysts which are non-depolymerizing.

Another object is to prepare relatively highly polymerized cellulose triesters which on partial hydrolysis yield an acetone-soluble, fiber-forming product.

A further object is to provide a process for the preparation of acetone-soluble, fiber-forming cellulose acetate possessing a relatively high degree of polymerization.

These and other objects will become apparent in the course of the following specification and claims.

Cellulose esters vary over a wide range in their solubility and fiber-forming characteristics. These properties are affected particularly by the size of the cellulose molecule and by the extent of its esterification. In the production of cellulose acetate fibers and films, it is important to obtain a product which is acetone-soluble to permit dry extrusion. Conventional processes employ a sulfuric acid catalyst in the esterification step. This promotes complete esterification to the acetone-insoluble triester form. It is followed by an easily controlled hydrolysis to the acetone-soluble or secondary form. Attempts to employ the usual non-acidic esterification catalysts have usually resulted in failure to reach complete esterification. In certain cases where essentially complete esterification has been accomplished, using non-acidic catalysts, the partially saponified material suffers from limited solubility in acetone. The success of the acid-catalyzed process has been attributed to the occurrence of a partial depolymerization of the cellulose molecule which occurs in the presence of sulfuric acid.

In accordance with the present invention, a process is provided whereby cellulose is subjected to a pretreatment which permits rapid esterification to the triacetate stage in the presence of non-acidic catalysts, the esterification being then followed by partial hydrolysis to yield an acetone-soluble secondary cellulose acetate. The pretreatment involves a depolymerization of the raw cellulose to below an average degree of polymerization of about 700. The preferred range is from 250 to 650. Cellulose which has reached an average degree of about 200 is no longer suitable. The average degree of polymerization is determined from measurements of intrinsic viscosity, the relationship being universally recognized in the art.

The depolymerization is conveniently accomplished by comingling the starting cellulose with an aqueous solution of an acid. The contact period will vary with the type of acid, its strength and the temperature of the system. A temperature within the range of 20° to 100° C. is satisfactory. Concentrated acid or mixtures thereof may be used. Acids of one normal (1 N) strength are suitable. Shorter contact periods are required when the higher temperatures and/or higher strength acids are used.

In the acid catalyzed esterification, depolymerization and esterification occur simultaneously. Under these conditions there is always danger of over-depolymerization as well as under-depolymerization. In accordance with the present invention, depolymerization is accomplished as a distinct and easily-controlled step. The esterification is performed under conditions which do not cause depolymerization. The slight depolymerization which occurs on partial hydrolysis is easily controlled within narrow limits. Thus, the present process permits improved control over the extent to which the cellulose molecule is depolymerized. This improved control, in turn, makes possible the manufacture of acetone-soluble cellulose esters of a much higher average degree of polymerization than is realized in sulfuric acid catalyzed esterification in spite of the initial partial depolymerization. Furthermore, the product of the present invention contains no combined sulfate such as occurs by the use of sulfuric acid esterification and saponification catalysts. Combined sulfate contributes to thermal instability of yarns, filaments, pellicles and the like produced from cellulose acetate. Its removal is an item of considerable importance in conventional operations.

The speed of the depolymerization is a function of the particular acid, its concentration and the temperature as pointed out above. Any acid, and particularly those which ionize readily in water, may be employed. Among these may be mentioned sulfuric, hydrochloric, phosphoric, perchloric, acetic and the like. Strong acids, i. e., those that ionize readily (sulfuric, hydrochloric, nitric) are preferred because they accomplish the desired depolymerization of cellulose much more rapidly than weak acids, such as acetic. Acid salts, such as potassium acid sulfate ($KHSO_4$), salts of strong acids and weak bases (($NH_4$)$_2SO_4$), and non-aqueous systems containing strong acids such as sulfuric acid dissolved in acetic acid may also be employed. Where salts are employed they may be used in aqueous solutions within the same general limits of concentration, time and temperature as for the acids. Sulfuric acid is preferred due to its rapid action on cellulose, low cost and ease of handling. The extent to which depolymerization occurs will vary according to the particular type of cellulose employed and the type of product desired.

Among the esterification catalysts which have been found to have no undesirable depolymerizing effect toward cellulose are certain salts of potassium and sodium having a pH of 7 or above in aqueous solution such as potassium and sodium acetates. Potassium acetate is preferred. Other acetates may be employed, although their catalytic powers are definitely inferior to the potassium salt. Potassium salts, in general, for instance the formate, fluoride, propionate, carbonate and chloride, are effective. These catalysts may be employed in conjunction with certain activating organic reaction media, such as a member of the group consisting of N,N-dialkylformamides, as, for instance, N,N-dimethylformamide, N,N-dimethylacetamide, and also N-formyl morpholine, N-acyl morpholine, gamma-butyrolactone and gamma-valerolactone. The use of such activators is described in detail in United States Patent Nos. 2,632,006 and 2,632,007 issued March 13, 1953, and is illustrated in Examples II, III and IV, presented below.

Any of the common types of cellulose may be used. Thus, the process is applicable to cotton, wood pulp, regenerated cellulose and the partially substituted cellulose derivatives, i. e., cellulose having from about ¼ to ¾ of its free hydroxyl groups substituted by organic radicals such as methyl, ethyl, hydroxyethyl, benzyl, and the like.

The invention is illustrated in greater detail by the following examples in which, for convenience, the degree of esterification is expressed in terms of "percent combined acid" where 62.5% combined acid (calculated as acetic acid) represents the cellulose triester stage. The examples, in which parts, proportions and percentages are by weight unless otherwise specified, are presented to illustrate the invention and are not intended to limit it in any way.

Example I

A 35 gram sample of cotton linters having a degree of polymerization of approximately 1800 is weighed out and steeped for five hours at 60° C. in 2 N sulfuric acid. It is then washed acid free with water and dried in an oven at 60° C. The resulting sample has a degree of polymerization of 564.

A 5 gram sample of the cotton linters, pretreated as described above, is esterified by heating it at reflux with 150 cc. of acetic anhydride containing 2.5 grams of potassium acetate as catalyst. At the end of one hour, the reaction is stopped by pouring the reaction products into a large volume of cold water. An analysis reveals the presence of 33% combined acetic acid.

The esterification is also performed on cotton linters without pretreatment. Only 24.9% combined acetic acid is found after one hour of reaction.

Employing pretreatment conditions similar to those outlined above, (5 hours at 60° C.) except that acid solutions of 3, 4 and 6 normalities are used, three other cotton linter samples are esterified. At the end of one hour of esterification, the pretreated 5 gram samples contain 38.0%, 50.4% and 59.0% combined acetic acid, respectively.

Example II

A 5 gram sample of each batch of the pretreated cotton linters of Example I, together with a control sample which was not pretreated, is esterified by heating at reflux for one hour with 20 cc. of acetic anhydride, 130 cc. of N,N-dimethylformamide and 2.5 grams of potassium acetate. The result of an analysis for combined acetic acid is expressed below:

|   | Pretreatment Batch | D. P.[1] | Percent Combined Acetic Acid |
|---|---|---|---|
| A | (No pretreatment) | 1,800 | 52.6 |
| B | (2 N sulfuric acid) | 564 | 56.9 |
| C | (3 N sulfuric acid) | 480 | 58.6 |
| D | (4 N sulfuric acid) | 440 | 60.0 |
| E | (6 N sulfuric acid) | 304 | 61.5 |

[1] Degree of polymerization of cellulose esterified.

A comparison of the degree of esterification upon the pretreated linters and the control samples in each of the above examples demonstrates the fact that such pretreatment greatly facilitates the esterification step in both the organic activated (Example II) and the non-activated (Example I) basic catalytic systems.

Although cotton is rather slow to react in basic catalyzed acetylations and is, therefore, more strikingly assisted by the pretreatment procedure, the process is nevertheless applicable as well to other celluloses, such as wood pulp, as demonstrated in the following example.

Example III

Three (3) wood pulp samples, identified below, are steeped in 1 N sulfuric acid for a period of three hours at 60° C. After washing acid free they are dried in an oven at 60° C.

Ten (10) grams of each of these samples treated as described above are heated at reflux in a mixture of 150 cc. of acetic anhydride and 150 cc. of dimethylformamide containing 5 grams of potassium acetate for one hour. The results are tabulated below:

| Wood Pulp | Percent Combined Acetic Acid |
|---|---|
| 95% alpha cellulose sulfate pulp | 60.4 |
| High quality acetylation grade pulp | 60.2 |
| 88% alpha cellulose hardwood pulp | 61.9 |

While sulfuric acid has been employed as the pretreating agent in the examples above, other acids may be used as indicated above and as is evidenced in the following example.

Example IV

Three normal (3 N) hydrochloric acid is employed to steep high quality, acetylation grade wood pulp having an average degree of polymerization of about 1200. At the end of 43 hours at 25° C., the degraded material is washed acid free and dried in an oven at 60° C. It is found to have a degree of polymerization of 650.

One hundred (100) grams of the product of this pretreatment is then acetylated to the triacetate stage (62.5% combined acetic acid) by heating in a mixture of 1500 cc. of acetic anhydride, 1500 cc. of dimethylformamide and 50 grams of potassium acetate for a period of 5 hours.

Thirty (30) grams of the triacetate is saponified by heating at reflux for 20 hours in the presence of 785 grams of 96.8% acetic acid and 7.5 grams of potassium acetate at 115° C. to a combined acetic acid content of 56.3%. Upon pouring the reaction mass into a relatively large body of cold water, a flaky white precipitate forms which is filtered out and washed with water until it is acid-free. This product, having a degree of polymerization of 460 is completely soluble in acetone.

While the specific examples are limited to the preparation of acetate esters, it is applicable as well to the preparation of other organic acid esters of cellulose as well as mixed organic acid esters. Although acetic anhydride is particularly described herein as the agent for esterifying cellulose, other esterification agents known to the art may be employed, depending on the process used and the type of ester desired.

Many other modifications of the above-identified invention, without departure from the inventive concept, will be apparent to those skilled in the art.

What is claimed is:

1. A process for the production of a cellulose ester which is saponifiable to an acetone-soluble form which comprises comingling cellulose with an acidic solution to effect depolymerization to an average degree of from about 200 to 700, washing the depolymerized cellulose free of acid and esterifying the resulting cellulose with an acylating agent in the presence of a non-depolymerizing catalyst from the class consisting of the sodium and potassium salt of a lower fatty acid.

2. A process for the production of a cellulose acetate which is saponifiable to an acetone-soluble form which comprises comingling cellulose with a solution of an acid to effect depolymerization to an average of from about 250 to 650, washing the degraded cellulose free of acid and acetylating the resulting cellulose with acetic anhydride in the presence of a potassium salt of a lower fatty acid.

3. The process of claim 2 wherein the acid is a strong inorganic acid.

4. The process of claim 3 wherein the strong inorganic acid is hydrochloric acid.

5. The process of claim 3 wherein the strong inorganic acid is sulfuric acid.

6. A process for the production of a cellulose acetate which is saponifiable to an acetone-soluble form which comprises comingling cellulose with a solution of an acid to effect depolymerization to an average of from about 250 to 650, washing the degraded cellulose free of acid, and acetylating the resulting cellulose with acetic anhydride in the presence of potassium acetate as the catalyst and an activating organic medium therefor.

7. The process of claim 6 wherein the catalyst activating organic medium is dimethylformamide.

8. A process for the production of a cellulose ester which is saponifiable to an acetone-soluble form which comprises comingling cellulose with an acidic solution to effect depolymerization to an average degree of from about 200 to 700, washing the depolymerized cellulose free of acid and esterifying the resulting cellulose in the presence of a non-depolymerizing catalyst from the class consisting of the salts of sodium and potassium which in aqueous solution have a pH above 7.

9. A process for the production of an acetone cellulose ester which comprises comingling cellulose with an aqueous solution of a mineral acid to effect depolymerization to an average degree of from about 250 to 650, washing the depolymerized cellulose free from acid, esterifying the resultant cellulose in the presence of a non-depolymerizing catalyst from the class consisting of the sodium and potassium salt of a lower fatty acid and thereafter saponifying the triester to the acetone-soluble form.

10. A process for the production of a cellulose ester which is saponifiable to an acetone-soluble form which comprises comingling cellulose with an aqueous solution of a strong mineral acid to effect depolymerization to an average degree of from about 200 to 700, washing the degraded cellulose free of acid, and esterifying the resultant cellulose in the presence of a non-depolymerizing catalyst from the class consisting of the sodium and potassium salts which in aqueous solution have a pH above 7 and an activating organic medium therefor.

11. A process for the production of a cellulose acetate which is saponifiable to an acetone-soluble form which comprises comingling cellulose with a mineral acid to effect depolymerization to an average degree of from about 250 to 650, washing the degraded cellulose free of acid, and acetylating the resulting cellulose with acetic anhydride in the presence of a nondepolymerizing catalyst from the class consisting of the sodium and potassium salt of a lower fatty acid and an activating organic medium therefor.

12. The process of claim 11 wherein the mineral acid is hydrochloric acid.

13. The process of claim 11 wherein the mineral acid is sulphuric acid.

14. The process of claim 11 wherein the activating organic medium is N,N-dimethylformamide.

15. The process of claim 11 wherein the activating organic medium is N,N-dimethylacetamide.

16. The process of claim 11 wherein the activating organic medium is N-acyl morpholine.

17. The process of claim 11 wherein the activating organic medium is gamma-butyrolactone.

18. The process of claim 11 wherein the activating organic medium is gamma-valeroactone.

19. A process for the production of an acetone-soluble cellulose acetate which comprises comingling cellulose with a solution of an acid to effect depolymerization to an average degree of from about 250 to 650, washing the degraded cellulose free of acid, acetylating the resultant cellulose with acetic anhydride in the presence of acetate as the catalyst and as an activating organic medium, N,N-dimethylformamide.

References Cited in the file of this patent

UNITED STATES PATENTS

| | | |
|---|---|---|
| 1,668,959 | Gray et al. | May 8, 1928 |
| 1,904,406 | Callahan | Apr. 18, 1933 |
| 1,916,273 | Martin et al. | July 4, 1933 |
| 1,922,287 | Haller | Aug. 15, 1933 |
| 1,925,309 | Dreyfus | Sept. 5, 1933 |
| 1,930,895 | Haller et al. | Oct. 17, 1933 |
| 2,536,634 | Fraizy et al. | Jan. 2, 1951 |